(12) United States Patent
Han et al.

(10) Patent No.: US 12,154,345 B2
(45) Date of Patent: Nov. 26, 2024

(54) SYSTEMS AND METHODS OF LEGIBLY CAPTURING VEHICLE MARKINGS

(71) Applicant: Digital Ally, Inc., Lenexa, KS (US)

(72) Inventors: Peng Han, Overland Park, KS (US); Jeremy A. Dick, Olathe, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 18/132,513

(22) Filed: Apr. 10, 2023

(65) Prior Publication Data

US 2023/0245462 A1    Aug. 3, 2023

Related U.S. Application Data

(63) Continuation of application No. 17/113,312, filed on Dec. 7, 2020, now Pat. No. 11,651,594, which is a continuation of application No. 16/720,272, filed on Dec. 19, 2019, now Pat. No. 10,860,866, which is a continuation of application No. 15/269,144, filed on Sep. 19, 2016, now Pat. No. 10,521,675.

(51) Int. Cl.
| | |
|---|---|
| *G06V 20/54* | (2022.01) |
| *G06V 20/62* | (2022.01) |
| *H04N 5/77* | (2006.01) |
| *H04N 7/18* | (2006.01) |
| *H04N 9/82* | (2006.01) |
| *H04N 23/60* | (2023.01) |

(52) U.S. Cl.
CPC .............. *G06V 20/54* (2022.01); *G06V 20/63* (2022.01); *H04N 5/77* (2013.01); *H04N 7/183* (2013.01); *H04N 9/8205* (2013.01); *H04N 23/60* (2023.01); *G06V 20/625* (2022.01)

(58) Field of Classification Search
CPC ......... G06V 20/54; H04N 23/60; H04N 7/183
USPC .......................................................... 348/148
See application file for complete search history.

(56) References Cited

U.S. PATENT DOCUMENTS

| | | | |
|---|---|---|---|
| 2007/0222859 A1* | 9/2007 | Chang .................. | H04N 23/631 348/148 |
| 2014/0176750 A1* | 6/2014 | Pajak .................. | H04N 23/632 348/222.1 |
| 2015/0358549 A1* | 12/2015 | Cho ........................ | H04N 23/73 348/333.11 |
| 2018/0199011 A1* | 7/2018 | Zimmerman .......... | H04N 23/60 |

* cited by examiner

*Primary Examiner* — Amir Shahnami
(74) *Attorney, Agent, or Firm* — Erise IP, P.A.

(57) ABSTRACT

A system and method for legible capture of vehicle identification data includes video cameras and a computer. Recording attributes such as gain, gain shutter speed, and white balance are adjusted throughout ranges to maximize the likelihood of capturing at least one frame in which characters, such as those on the license plate, are legible. Successful capture of a legible frame may trigger storage of the data, while unsuccessful capture may trigger additional scans.

20 Claims, 8 Drawing Sheets

SYSTEMS AND METHODS OF LEGIBLY CAPTURING VEHICLE MARKINGS

RELATED APPLICATIONS

This application is a continuation of U.S. patent application Ser. No. 17/113,312, filed Dec. 7, 2020, which is a continuation of U.S. patent application Ser. No. 16/720,272, filed Dec. 19, 2019, now U.S. Pat. No. 10,860,866, issued Dec. 8, 2020, which is a continuation of U.S. patent application Ser. No. 15/269,144, filed Sep. 19, 2016, now U.S. Pat. No. 10,521,675, issued Dec. 31, 2019, the disclosures of which are incorporated herein by reference.

BACKGROUND

1. FIELD

Embodiments of the invention are broadly directed to legible video capture of license plate data. More specifically, embodiments of the invention record video of a scene using systems and methods that increase the likelihood of capturing at least one frame in which a license plate or other identifiable vehicle marking is legible.

2. RELATED ART

Mobile recording systems, such as car-mounted cameras, serve many purposes for law enforcement officers and other first responders, such as documentation of events, collection of evidence, and improvement of training. One important function of recording systems used by law enforcement is the capture of license plate data. Capturing license plate data or other markings of a vehicle, suspect, victim, bystander, fellow officer, or a scene's surroundings may be key in proving guilt or innocence or locating parties of interest. Of course, to be of use in such matters, written characters (e.g., numbers, letters, punctuation, logos, hazardous waste symbols, symbols) captured in recorded images, such as a license plate, must be legible. In many situations, legible video capture of license plate data and other vehicle markings or scene surroundings is made difficult by factors such as high motion, darkness, and/or interference from sources such as light, smoke, or fog.

Typical systems and methods for license plate recognition attempt to improve legibility of license plates through improved illumination of the scene. Improving illumination requires bright lights that may be costly, distracting, power consumptive, ineffective, and/or logistically difficult to implement quickly. Other systems perform advanced processing to improve captured images but may be expensive, slow, and require very high processor dedication. What is needed is an improved system and method for video capture of legible license plate data and other vehicle markings or scene surroundings that does not require additional or enhanced illumination of a scene.

SUMMARY

Embodiments of the invention provide systems and methods for legibly capturing license plate data using a video camera. A first embodiment of the invention is directed to a method of scanning for a legible marking on a vehicle using a video camera with two or more recording attributes. Upon acquiring an indication to begin a scan with l a video camera, a first recording attribute is adjusted within a first scan range, between a first lower limit and a first upper limit. Thereafter, a second recording attribute is adjusted within a second scan range, between a second lower limit and a second upper limit. A portion of the scan that includes a legible marking on a vehicle is stored in a memory associated with the video camera or otherwise accessible by the video camera.

A second embodiment of the invention is directed to an image capture system including a video camera with at least a first recording attribute and a second recording attribute, a storage device, and a processor. The processor is configured to adjust a first recording attribute within a first scan range between a first lower limit and a first upper limit, adjust a second recording attribute within a second scan range, between a second lower limit and a second upper limit, and store in memory a portion of the scan that includes a legible marking on a vehicle.

A third embodiment of the invention is directed to a method of scanning for a legible marking on a vehicle using a video camera with two or more recording attributes. Upon acquiring an indication to begin a scan with a video camera, a first recording attribute is adjusted within a first scan range, between a first lower limit and a first upper limit. Next, a second recording attribute is adjusted within a second scan range, between a second lower limit and a second upper limit. Thereafter, a determination is made as to whether or not a marking on a vehicle has been legibly captured. Based on this determination, further steps may occur, including initiation of additional scanning or storage of a portion of video data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Each of the above embodiments may include further recording devices, hardware, or steps not explicitly described. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 5A:
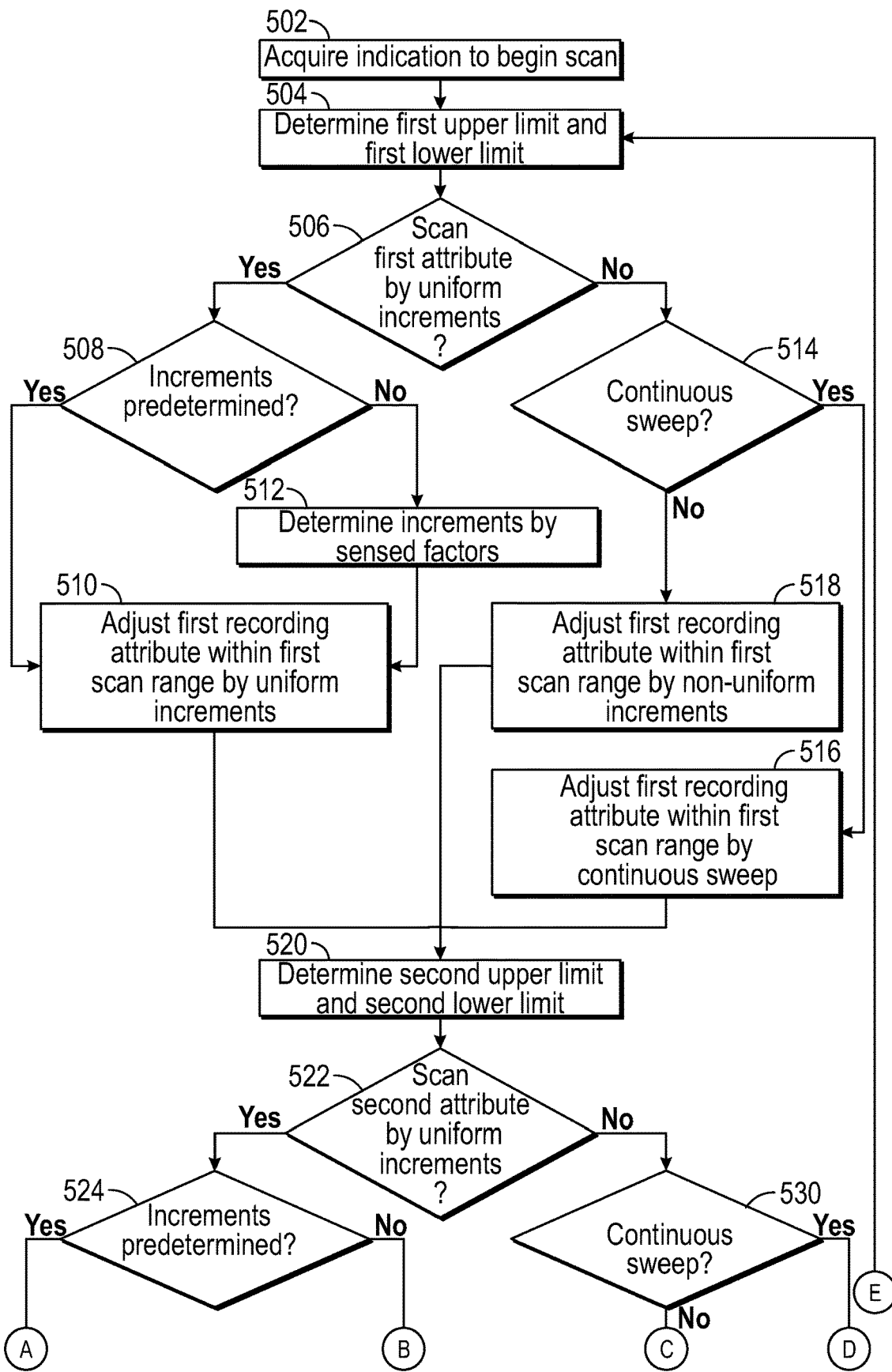
Figure 5B:
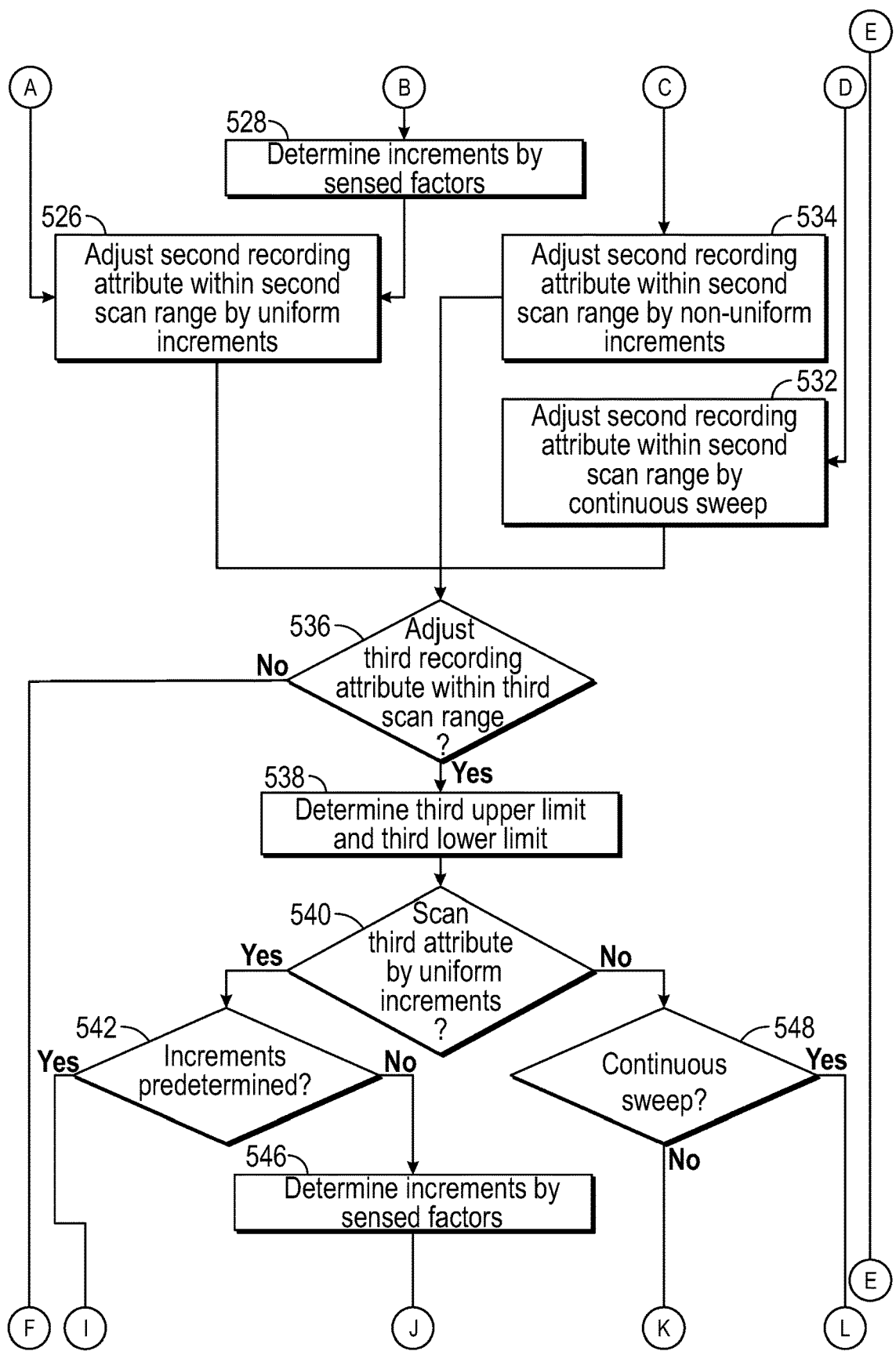
Figure 5C:
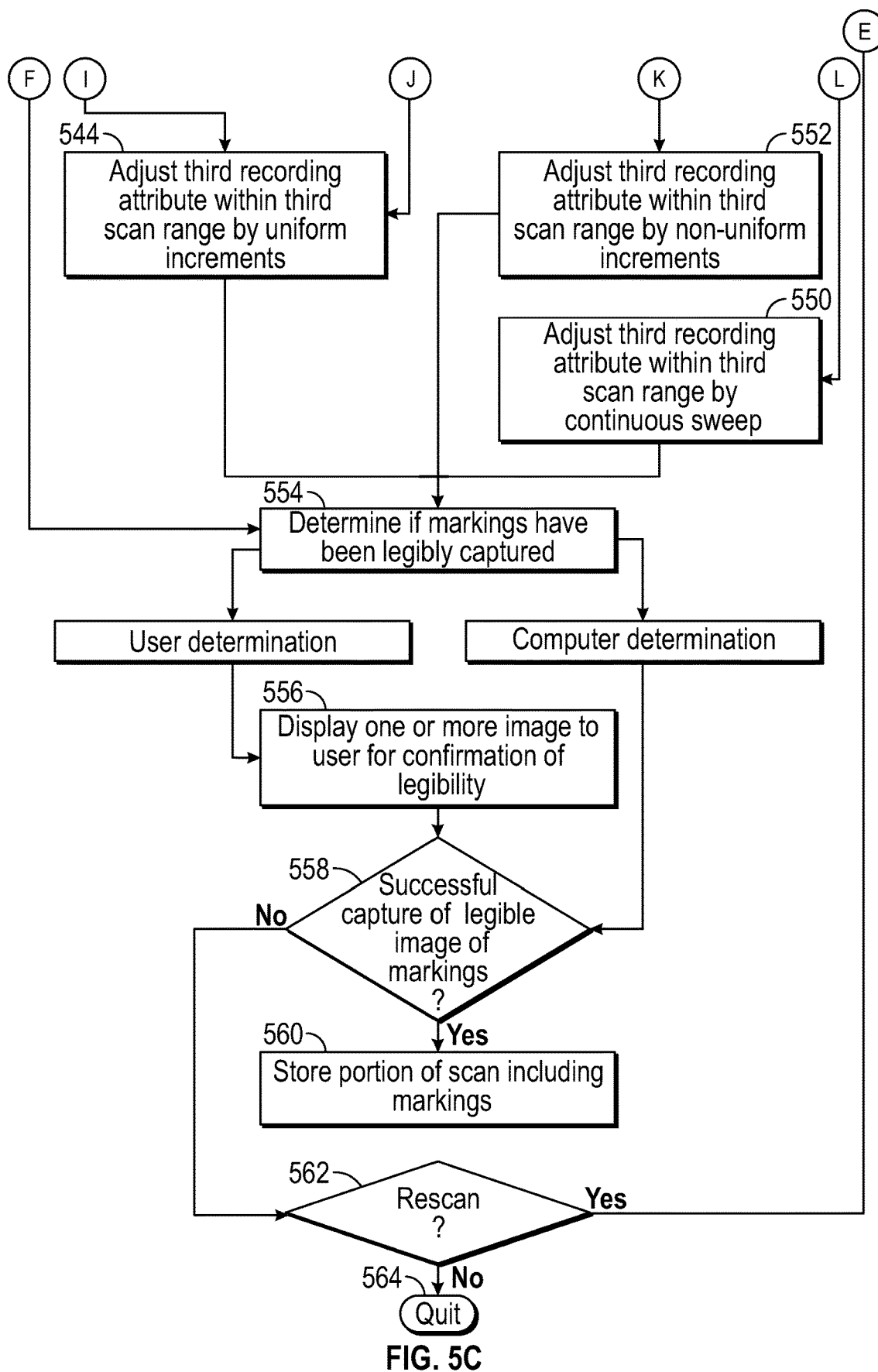

FIGS. 5A, 5B, and 5C illustrate a second flow diagram of steps that may be performed in embodiments of the invention; and The drawing figures do not limit the invention to the specific embodiments disclosed and described herein. The

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention provide systems and methods of capturing video data that adjust recording attributes of one or more video cameras to scan for a legible image of a license plate or other identifying characters or markings on a vehicle. Further, embodiments of the invention determine whether or not a legible image has been captured, and may take additional steps based on the determination. The additional steps may include rescanning the scene or storing the image data.

Figure 1A:
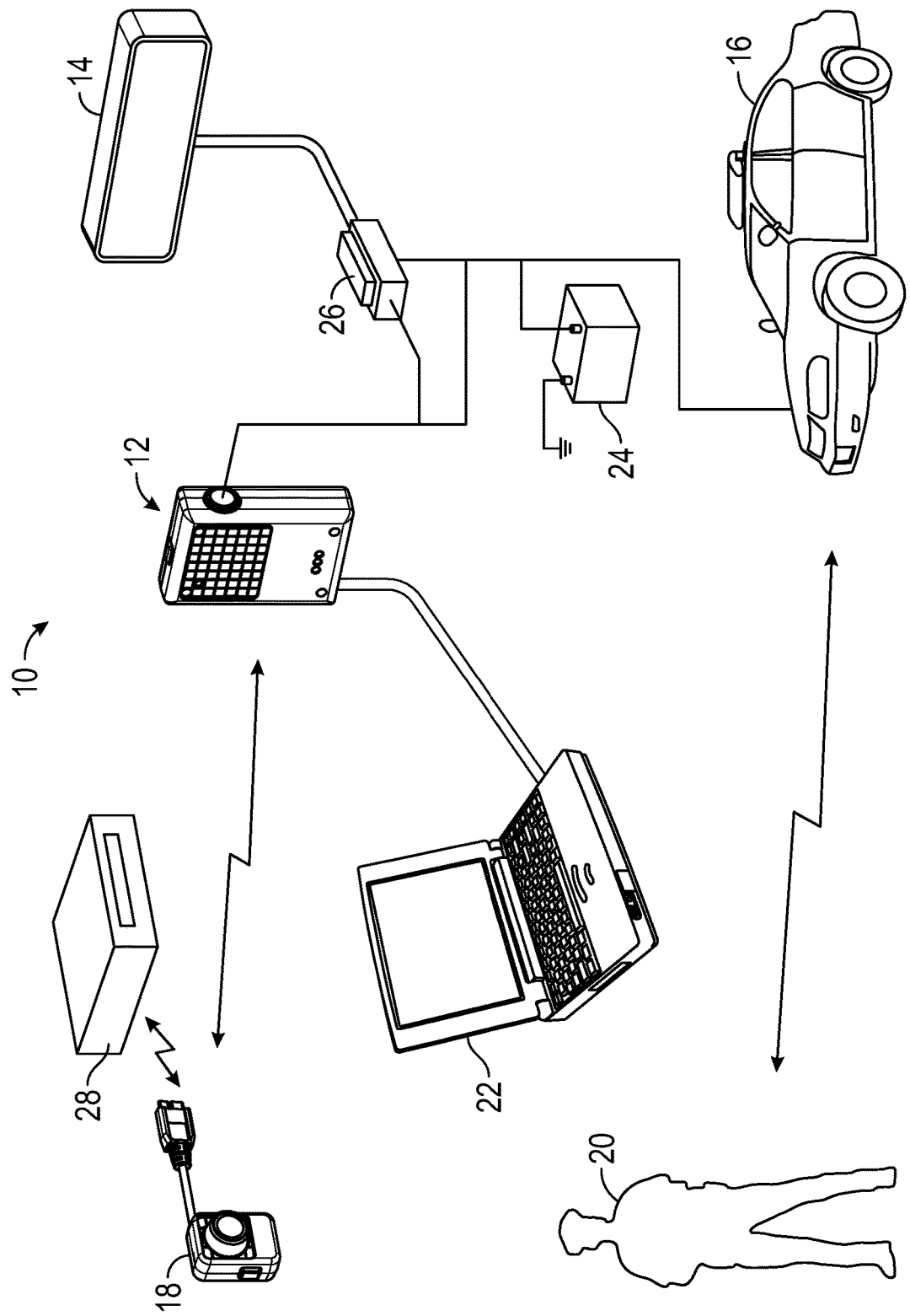
FIG. 1A is a diagram of elements comprising embodiments of the invention.

Turning to the figures, and particularly FIG. 1A, a first embodiment of a recording system 10 is described. FIG. 1A includes an intermediate recording device manager 12 (or "manager 12"), a vehicle recording device 14 mounted in a police vehicle 16 (or other first responder's vehicle) and communicatively coupled (e.g., synced) to the recording device manager 12, and a personal recording device 18. Personal recording device 18 may be carried by a police officer 20 or other first responder and wirelessly synced to the recording device manager 12. The recording device manager 12 is operable to detect when the vehicle recording device 14, personal recording device 18, or any other synced device in range has started recording and to broadcast or transmit a signal to other synced recording devices in range, instructing recording by the respective device. The recording device manager 12 may also generate time stamps and unique serial numbers for a data recording, and create or collect metadata and transmit such time stamps, unique serial number, and metadata to the recording devices 14, 18 for corroborating the recorded data. For illustrative purposes, the recording system 10 includes the vehicle recording device 14 and the personal recording device 18, but it will be understood that duplicate or additional devices, such as audio recorders, thermal imagers, security cameras, radios, radar and LIDAR scanners, and electronic weapons, can be synced to the recording device manager 12. Specifically, multiple recording devices 14, 18 can be synced with the manager 12 simultaneously.

In embodiments of the invention, the vehicle recording device 14 and personal recording device 18 are each video cameras operable to record data, including without limitation, audio data and video data. Moreover, the recording devices 14, 18 are also operable to record or generate metadata associated with the recording, such that the data recorded by the devices 14, 18 includes the audio data, the video data, and/or the metadata associated with either or both of the audio and video data. Examples of metadata for an audio or video recording include a location (as determined by a GPS) where the data was recorded, a user who recorded the data or was otherwise associated with the recording device 14, 18 (e.g., an officer driving a police vehicle or an officer wearing the personal recording device 18), the time stamp and/or unique serial number, a trigger for the data recording event (e.g., what prompted a data capture scan by the recording devices), and other data related to the recorded event. Additionally, as further discussed below, the metadata may include or link to data derived from identifying marks on a subject vehicle.

The recording device manager 12 is illustrated in FIG. 1A as a standalone device but can be incorporated into other devices, such as a laptop (including external computing device 22), a radio, a recording device (including the vehicle recording device 14), a mobile communications device, a battery pack, or an electronic weapon. The recording device manager 12 may be permanently or removably mounted anywhere in the police vehicle 16, such as on the dashboard, center console, or windshield. Alternatively, the recording device manager 12 can be carried or worn by the police officer 20, such as on his utility belt or in his pocket.

Figure 1B:
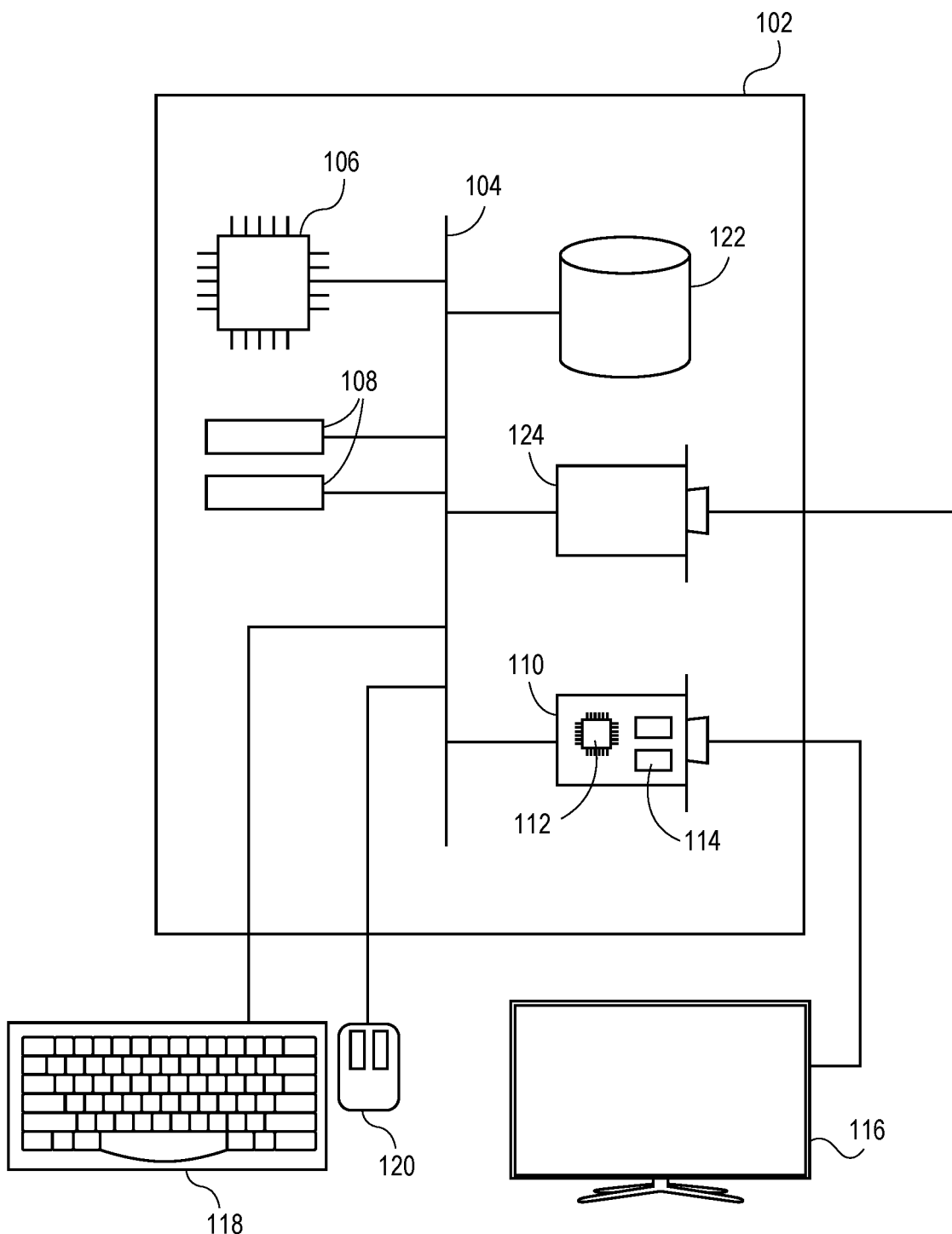
FIG. 1B is a further diagram of elements comprising embodiments of the invention.

Exemplary hardware included in embodiments of the invention is illustrated in FIG. 1B. Computer 102 can be a laptop computer, as illustrated as external computing device 22 of FIG. 1A. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (or "processor") 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the processor 106. In some embodiments, graphics card 110 has a separate graphics-processing unit (GPU) 112, which can be used for graphics processing. Also on graphics card 110 is GPU memory 114. A display 116 may be connected (directly or indirectly) to graphics card 110 for user interaction. In some embodiments no display is present, while in others it is integrated into computer 102, or detached physically and remotely connected to computer 102. Similarly, peripherals such as keyboard 118 and mouse 120 may be connected to system bus 104. Like display 116, these or other peripherals may be integrated into computer 102, remotely connected, or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network. NIC 124 can be any form of network interface known in the art, such as Ethernet, ATM, fiber, Bluetooth, or Wi-Fi (i.e., the IEEE 802.11 family of standards). NIC 124 may connect computer 102 to a local network, optionally via a CAN bus 26, as further described below. The local network may in turn connected to Internet, or in some embodiments computer 102 may itself be directly connected to Internet.

Returning to FIG. 1A, external computing device 22 may be coupled to recording device manager 12 via wired or wireless connection. The external computing device 22 can be a laptop, tablet, mobile device, smartphone, or other computing device. The external computing device 22 displays a graphical user interface (GUI) by which the police officer 20 or other user may view recorded data and make selections regarding the recording system 10. As further described below, external computing device 22 may function as an input/output device to allow an officer to judge the legibility of characters captured in video data. External computing device 12 may include a central processing unit (CPU) and one or more random-access memory (RAM) modules, as well as a graphics card and display for user interaction. In some embodiments no display is present, while in others it may be spaced apart from and coupled to an external computing device 22. Similarly, peripherals such as keyboard and mouse may be coupled to external computing device 22. Like the display, these peripherals may be integrated into external computing device 22 or absent. External computing device 22 may be touch-sensitive, allowing an officer to input data or make selections via tap, swipe, or other gesture.

A power source 24 may be electronically connected to the vehicle recording device 14 through dedicated wiring. The power source 24 supplies power to each of the electronic components of the vehicle recording device and, in embodiments of the invention, to the recording device manager 12 and/or the personal recording device 18. In embodiments of the invention, the power source 24 is the police vehicle's battery but can be another power source, such as a battery cartridge of the external computing device 22.

The electronic connection between the recording device manager 12, the vehicle recording device 14, and the personal recording device 18 optionally includes a control area network (CAN) bus 26, which "directs traffic" for incoming and outgoing signals based on indicated importance or other factors and follows an algorithm for determining the order in which (or whether) signals are transmitted.

The vehicle recording device 14 is operable to record audio, video, and/or other data. In some embodiments, the vehicle recording device 14 is a video recording device such as one produced by Digital Ally, Inc., including the DVM100, DVM250, DVM250Plus, DVM250Law, DVM400, DV440Ultra, DVM470, DVM500, DVM500Plus, and DVM750. As described below, in some embodiments the vehicle recording device 14 is operable to receive a signal of a triggering event, while in other embodiments the vehicle recording device 14 utilizes the CAN bus 26 and is operable to receive time stamps and metadata in addition to the signal of a triggering event. The vehicle recording device 14 can be incorporated into the police vehicle's rear view mirror, dashboard, spotlight, or other locations associated with the police vehicle 16 or may be a stand-alone unit mounted within or on the police vehicle 16. The vehicle recording device 14 may receive power from the power source 24 through dedicated wiring. In addition to the exemplary vehicle recording devices listed above, a vehicle recording device is further described in commonly-owned U.S. Pat. No. 8,520,069, issued Aug. 27, 2013, entitled "Vehicle-Mounted Video System with Distributed Processing," the entirety of which is incorporated by reference herein.

The personal recording device 18 is small, portable, wearable, easily concealed, and is operable to record audio, video, thermal, chemical, or other data. The personal recording device 18 can be worn by the officer 20, such as on the officer's shirt, hat, eyeglasses or sunglasses, electronic weapon, breath analyzer, or other device accessed or used by the officer. The personal recording device 18 is operable to receive a signal instructing the device 18 to begin or stop scanning (as discussed in further detail below), a signal indicative of a triggering event, and time stamps and metadata corresponding to the recordings. Additionally, the personal recording device 18 may further include a clock for determining a time corresponding to when a particular item of data was recorded. An exemplary personal recording device is the "FIRSTVU HD" produced by Digital Ally, Inc. and further described in U.S. Pat. No. 9,019,431, issued Apr. 28, 2015, and commonly assigned with the present application, the entirety of which is hereby incorporated by reference into the present application.

Recordings generated by the recording devices 14, 18 and associated metadata may be temporarily or permanently stored in a local memory element (hereinafter "memory"), such as a memory of the particular recording devices 14, 18, and/or a memory of external computing device 22 located in the police vehicle 16. The recording devices 14, 18 may alternatively or additionally be allowed to upload recordings to an external server or storage device. The external server or storage device could be a large-capacity storage device 28, such as a DVR housed in the vehicle, or may be a centralized computing device, such as housed at a police precinct. These examples are not meant to be limiting; any form of data storage and duplication is intended within embodiments of the invention.

An exemplary scenario of the recording system 10 in use is now described for illustrative purposes. The recording system 10 may be used by the police officer 20 to record video data during an event such as a traffic stop. The recording device manager 12 may be mounted near the vehicle recording device 14, such as on the windshield of the police vehicle 16, or may be integrated within a housing of the vehicle recording device 14. Alternatively, the recording device manager 12 may be mounted anywhere within the police vehicle 16 that allows for the recording device manager 12 to communicate (either via a wired or wireless connection) with the vehicle recording device 14. In embodiments of the invention, the vehicle recording device 14 is oriented in a forward direction relative to a front of the vehicle to record the traffic stop, and in yet further embodiments, multiple vehicle recording devices 14 may be mounted in or on the vehicle and oriented in different directions relative to the vehicle, such as backwards towards a rear of the vehicle, and to the left and right sides of the vehicle. The personal recording device 18 is mounted to the police officer's person or is otherwise carried by the police officer 20, such as on a lanyard, belt, or shoulder. In embodiments of the invention, the personal recording device 18 may include a GPS, an RFID, or another type of location or identification feature or sensor (not shown) that informs the recording device manager 12 of the relational location of the personal recording device 18 to the recording device manager 12. Alternatively, the officer may carry on their person a GPS (such as housed within or associated with a mobile communications device), RFID, or other type of location or identification sensor. Recording system 10 may include additional sensors not illustrated in FIG. 1A, such as a rangefinder. Data collected from such sensors may be stored along with video, audio, and metadata, and may be used in detection of trigger parameters or determination of scan range limits, as further discussed below.

Embodiments of the invention are not intended to be limited to the traffic stop situation described above. Embodiments may be stationary or mobile camera systems employed by businesses to record the identity of vehicles arriving and departing from a parking lot. Alternatively, embodiments may be employed in maritime settings, such as for tracking of shipping containers. In other embodiments of the invention, a military installation may use a camera system to pre-screen vehicles approaching a secure location. Any system including one or more video recording devices that scan for a legible image of a marking on a vehicle may fall within embodiments of the invention.

Returning to the law enforcement example, in embodiments of the invention, the recording device manager 12 may activate a data capture scan (or simply "scan") from vehicle recording device 14 and/or personal recording device 18 responsive to a triggering event (also more simply known as a "trigger"). Examples of a triggering event may include, for example, turning on the vehicle's siren and/or signal lights, an indication that the vehicle is parked, an electronic detection of a subject car or a license plate, an accelerometer measurement outside a pre-established norm, a position of the vehicle and/or officer as measured by a GPS, a vehicle crash event, the police vehicle 16 attaining a threshold speed (e.g., 80 m.p.h.), activation of an electronic weapon, opening of the vehicle door, and/or activation of a radar or the radar detecting a subject car's speed at or over a pre-determined speed. In embodiments, the recording device manager 12 may receive a signal from, for example, the vehicle recording device 14, external computing device 22, or police vehicle 16 indicative of a triggering event. In response to receipt of the signal, or based on a type of triggering event as evidenced by the signal, the recording device manager 12 may instruct recording by the vehicle recording device 14 or the personal recording device 18 to begin a scan. As an exemplary scenario, the recording device manager 12 may receive a signal identifying a triggering event of a police vehicle 16 being placed in park while the vehicle signal lights are activated. Upon receipt of the signal, the recording device manager 12 sends a signal to either or both of the vehicle recording device 14 or the personal recording device 18 to instruct the devices 14, 18 to begin a scan. It should be appreciated that other types of triggering events and exemplary scenarios can be employed.

Alternatively, a data capture scan may be activated manually based on a user's manual selection, for instance via a police officer's button press of recording device manager 12, vehicle recording device 14, or external computing device 22. A manual selection may be made remotely from a fob carried by police officer 20 or a control integrated into the structure of personal recording device 18. In embodiments of the invention, a manual selection may be made by a remote user, such as by a dispatcher at a police station. As further discussed below, whether initiated via a trigger or via manual indication, a scan serves to adjust one or more recording attributes between a lower limit and upper limit to search for a legible image of a license plate or other vehicle marking.

Figure 2A:
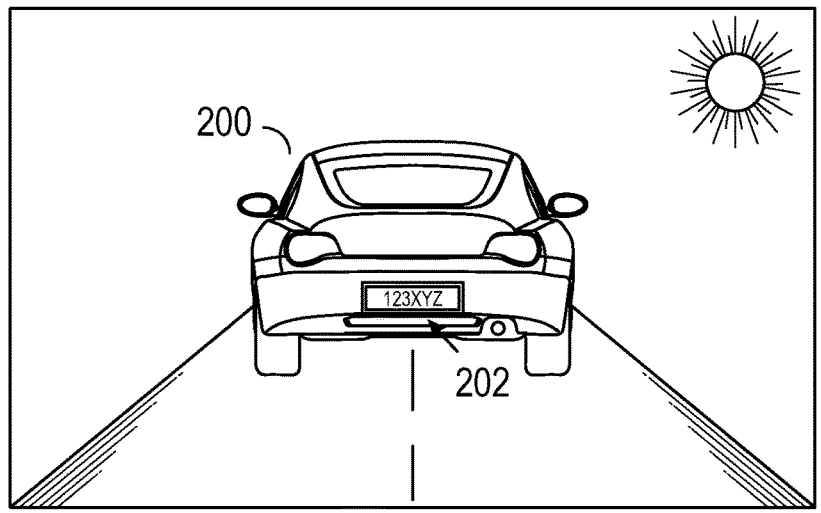
FIG. 2A is an illustration of an ideal clear image of a vehicle with legible markings thereon.
Figure 2B:
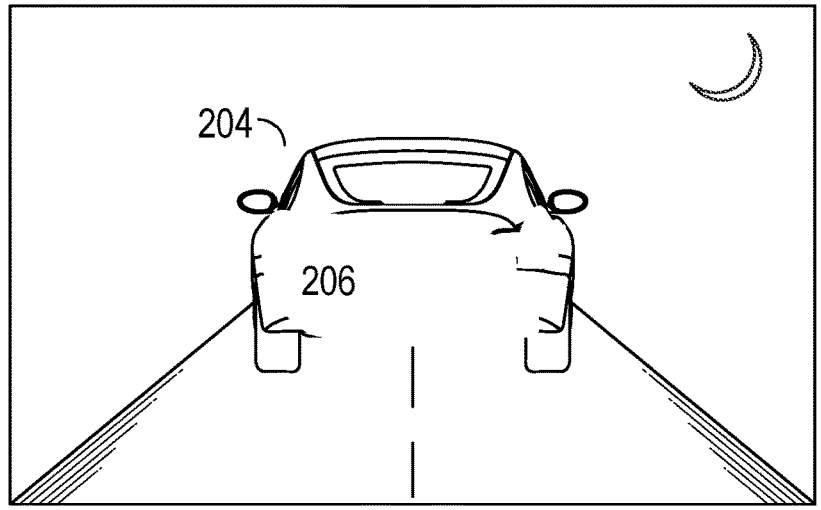
FIG. 2B is an illustration of a clear image of a vehicle with a license plate having illegible markings.
Figure 2C:
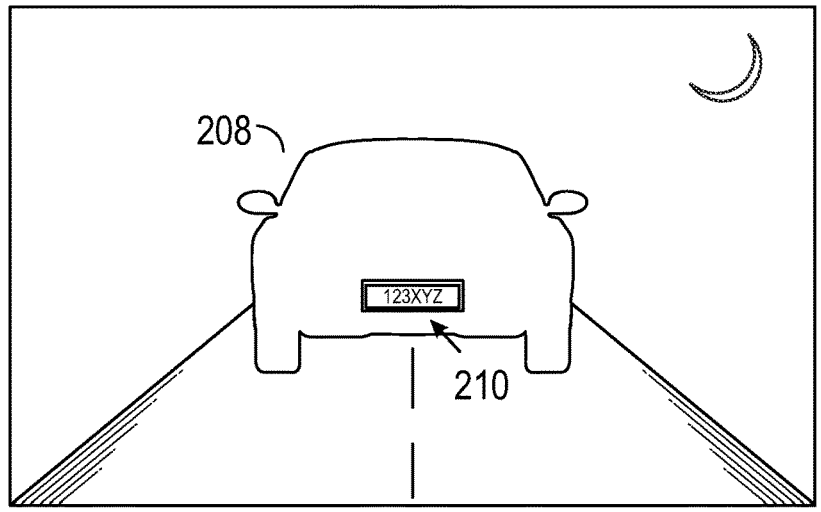
FIG. 2C is an illustration of an unclear image of a vehicle with a license plate having legible markings.

FIGS. 2A-C illustrate examples of images captured by a recording device such as vehicle recoding device 14 of a subject vehicle 200,204,208 with a license plate 202,210 during a typical traffic stop situation introduced above. FIG. 2A illustrates a captured image of a subject vehicle 200 during a traffic stop occurring on a clear day with ideal recording conditions. Factors such as the make, model, color, damage, decals, bumper stickers, etc. of vehicle 200 can be distinguished in the captured video data, as well as the actions of figures in the scene. In particular, the license plate 202 of vehicle 200 is legible. Under such conditions, the license plate 202 will likely be clearly readable from portions of the video data captured (which may be motion video and/or still frames) by a human observer and/or a computer character recognition program.

FIG. 2B illustrates a similar situation to that illustrated in FIG. 2A, only in this instance the traffic stop is occurring at night, when recording conditions are less ideal. A subject vehicle 204 identical to vehicle 200 in FIG. 2A has been pulled over, and an image is captured from vehicle recording device 14 mounted forward-facing in police vehicle 16. The subject vehicle 204 can again be distinguished by factors such as make, model, color, etc., though perhaps to a lesser extent than in FIG. 2A. However, interference from sources such as the headlights of police vehicle 16 reflecting from the rear 206 of subject vehicle 204 has washed out the image of the license plate, making it completely illegible. This effect is known as "bloom," and inhibits the ability of a user or computer program to definitively determine the identity of subject vehicle 204 from the recorded video data. As seen in FIG. 2B, the effect of bloom can be impactful enough to saturate the recording camera in region 206 of the image, such that the license plate cannot be seen at all.

FIG. 2C illustrates the traffic stop situation a third time, again occurring at night as in FIG. 2B. A subject vehicle 208 identical to vehicles 200,204 in FIGS. 2A-B has been pulled over, and an image is captured from vehicle recording device 14 mounted forward-facing in police vehicle 16. In illustrated image capture of FIG. 2C, one or more recording attributes of vehicle recording device 14 have been adjusted such that the bloom effect of the reflected headlights has been minimized. The subject vehicle 208 as a whole is actually much less distinguishable in terms of make, model, color, etc. compared to subject vehicle 204 of FIG. 2B, but the critical information of license plate 210 is legibly captured. The video data recording illustrated in FIG. 2C may be less likely to capture any events happening in the recorded scene but is valuable for establishing proof of the identity of subject vehicle 208.

Embodiments of the invention adjust one or more recording attributes of one or more video recording devices, such as vehicle recording device 14 or personal recording device 18, to scan for at least one frame of a legible image of markings on a vehicle, such as those on a license plate. As in the example illustrated in FIG. 2C, the frame containing legible markings for which the recording devices are scanning may be dark, obscured, unfocused, or otherwise unclear with respect to any elements of the scene other than the license plate (or other vehicle markings of interest). This is not intended to be limiting, as the legible frame may present a clear view of all elements of the scene, as in FIG. 2A. Examples of recording attributes that may be adjusted include gain, shutter speed, focus, white balance, sharpness, backlight compensation, iris aperture, or any other applicable adjustable attribute of the recording devices.

Because adjusting the recording attribute(s) of the recording devices 14,18 to legibly capture the license plate 200, 210 may reduce visibility of other elements in the recorded scene, embodiments of the invention may not permanently set the recording attributes to such values. Doing so is unnecessary, as only a single legible frame is needed for identification purposes. Additionally, permanent adjustment of the recording attributes might require significant computation to determine the appropriate values and may render the recording less valuable as a documentation of events in the scene. Rather, in embodiments of the invention, selected recording attributes are only temporarily adjusted to scan for a legible image of a marking on a vehicle, such as a license plate. For example, a recording attribute such as gain may be adjusted across a range of values, searching for a single value within that range at which the license plate is legible. In embodiments of the invention, one or more recording devices 14,18 perform a scan for legible markings on a vehicle while other recording devices 14,18 continue recording video data using normal recording attributes. In this way the portion of recorded video occurring during the scan is recorded as usual. It should also be appreciated that embodiments of the invention may employ a dedicated vehicle recording device 14 for capturing the image or scanning the vehicle for markings.

The scan range for a particular attribute includes a lower limit and an upper limit, each of which may be a predetermined limit programmed into memory, may be selected manually by a user, or may be dynamically selected by the recording system 10 based on factors such as the time of day, a sensed ambient light level, or a distance measurement. Such a distance measurement may be, for instance, from the recording device 14,18 to the subject vehicle 200. Alternatively, a distance measurement may be estimated by an officer 20 and entered via external computing device 22. Manual selections may be presented to the user as multiple choice selections based on the user's evaluation of the visibility of the scene, such as a "low-light" scan range, "high interference" scan range, or "long distance" scan range. These scan ranges are meant only as examples, and are not intended to be limiting in any way.

A recording attribute may be adjusted within a scan range by a continuous "sweep" of the scan range or may be adjusted incrementally by set values. The incremental values by which a recording attribute is adjusted may be uniform increments, which may be predetermined increments programmed into memory or may be selected manually by a user. Alternatively, uniform increments may be dynamically selected by the recording system based on sensed parameters such as the time of day, a sensed ambient light level, or a distance measurement. Like the scan range limits, the increments of adjustment of a recording attribute within a scan range may be presented to the user as multiple choice selections based on their evaluation of the visibility of the scene, such as "low-light" adjustments, "high interference" adjustments, or "long distance" adjustments. Again, these are meant only as examples, and are not intended to be limiting in any way.

In the course of performing a scan for a legible marking on a vehicle, embodiments of the invention may adjust more than one recording attribute within respective scan ranges, each scan range including a respective upper and lower limit. For example, a scan may adjust gain between a minimum level of 30% and a maximum level of 70% and also adjust shutter speed between 0.02 and 0.05 seconds. The adjustments may be done simultaneously, or may be performed independently of one another, with the value of one recording attribute adjusted while the other is held at a static value. Specifically, a first recording attribute may remain at a first value within its first scan range while a second recording attribute is adjusted within its second scan range, and the second recording attribute may remain at a second value within its second scan range while the first recording attribute is adjusted within its first scan range.

In some embodiments, the value of a given recording attribute may be adjusted throughout a scan range multiple times, with the values of other recording attributes held at different static values each time. For instance, gain may be adjusted between a 30% lower limit and a 70% upper limit while the shutter speed is held at 0.025 seconds, and then adjusted again between the same limits while the shutter speed is held at 0.05 seconds. The shutter speed may then be adjusted one or more times while the gain is held at one or more static values. Static values may be predetermined, selected by a user, or determined dynamically by the system upon initiation of a scan. The above examples are not intended to be limiting. In embodiments of the invention, more than two recording attributes may be adjusted simultaneously or independently while other recording attributes are held static. Specifically, a scan may include a third scan range including a third upper limit and a third lower limit. For example, a single scan may adjust shutter speed, gain, and white balance between upper and lower limits. Any combination of increments, selected type and number of recording attributes, upper and lower limits, and independence or simultaneity of adjustments are intended within embodiments of the invention.

Figure 3:
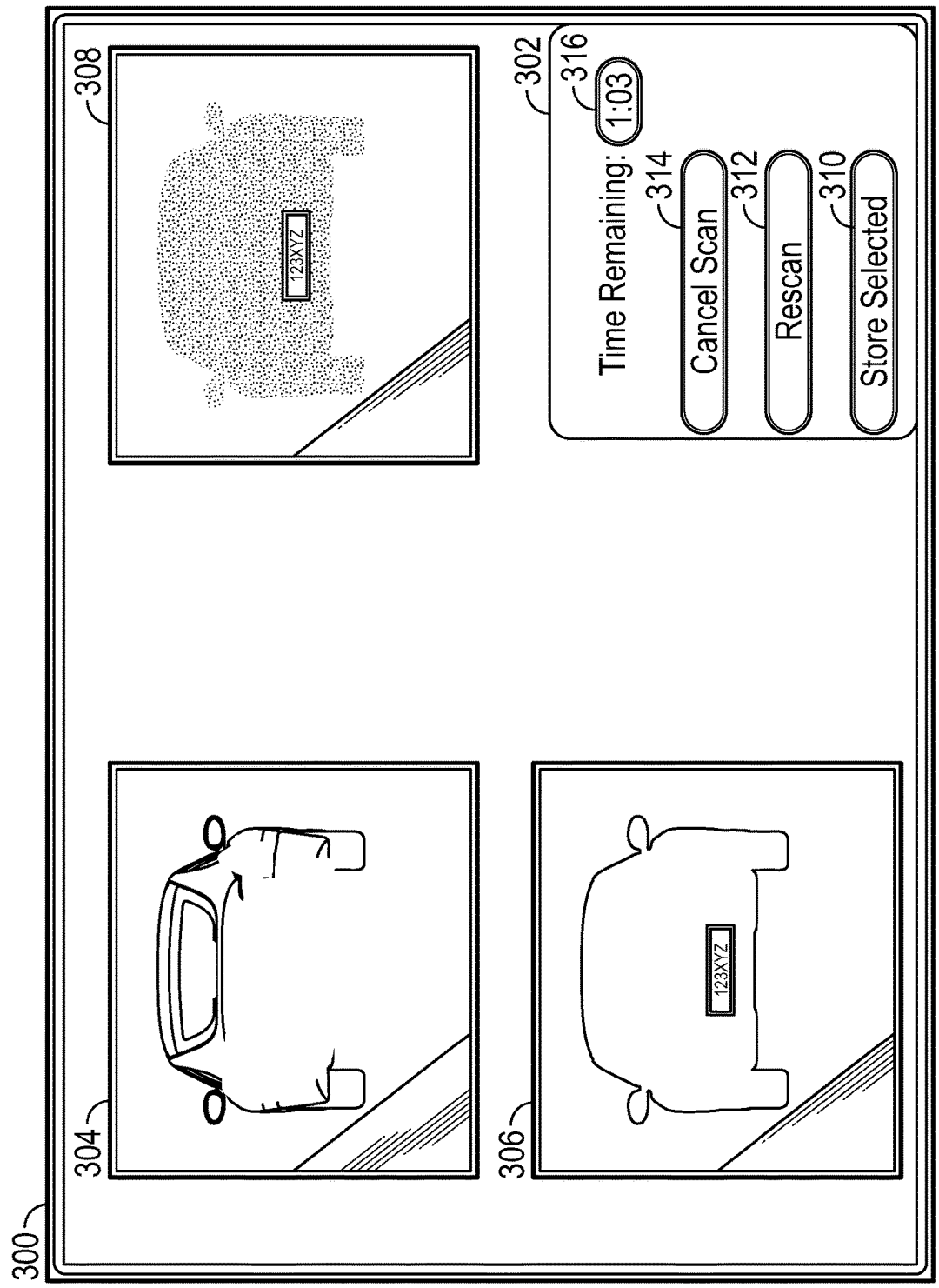
FIG. 3 is an illustration of a display of embodiments of the invention for presenting representative images of a license plate and soliciting user response.

In embodiments of the invention, representative image captures from a scan may be presented to a user on a display, as illustrated in FIG. 3. As discussed below, a user may respond to one or more images presented on the display via touch or through a separate input device to indicate success or failure of the scan and/or select further steps to be performed. FIG. 3 is intended only as an illustration of a display presented in embodiments of the invention, and is not intended to be limiting.

Figure 4:
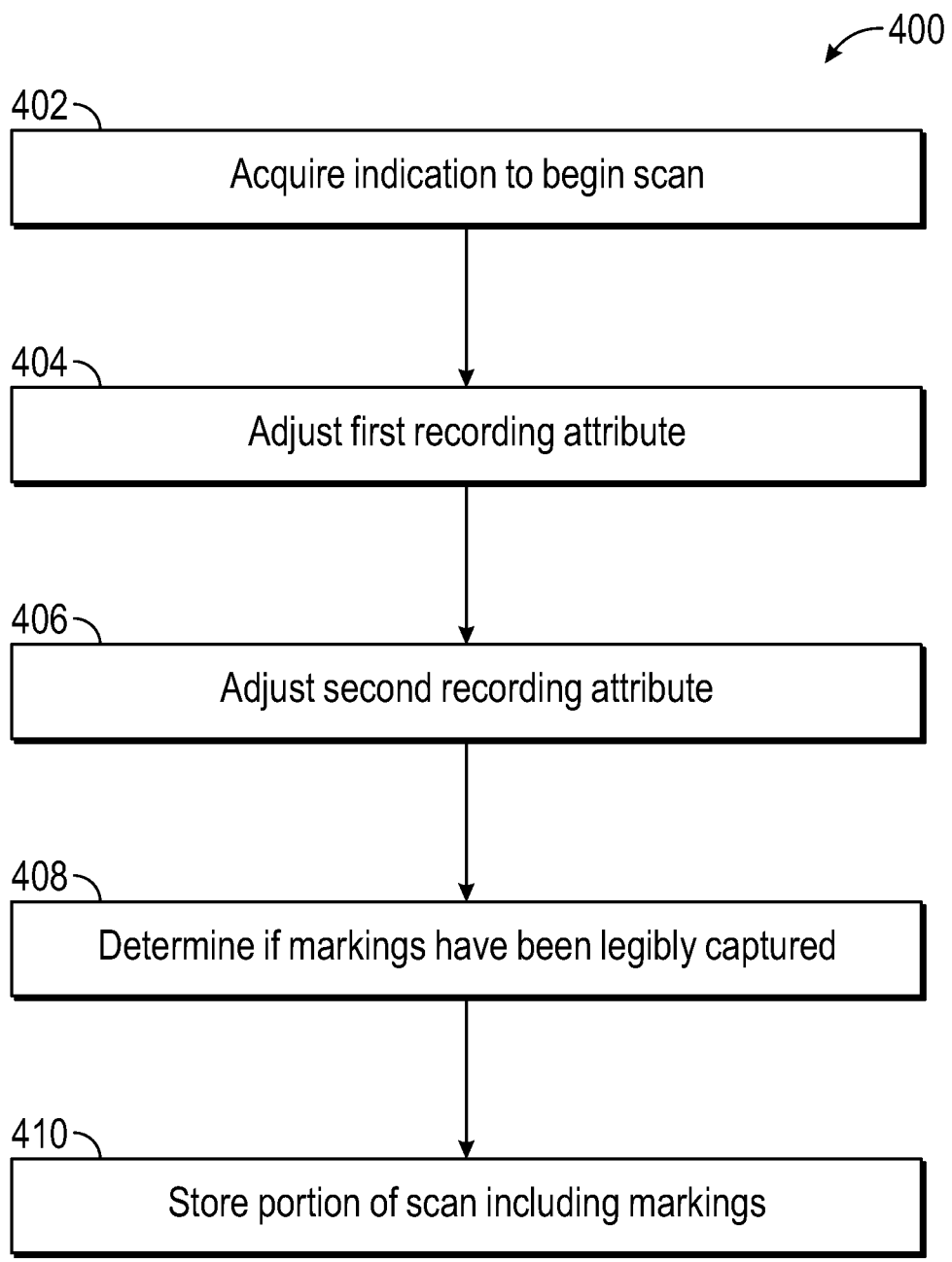
FIG. 4 is a first flow diagram of steps that may be performed in embodiments of the invention.

FIG. 4 broadly illustrates steps performed in operation of an embodiment of the invention. These steps may be performed during an event such as a traffic stop, where a video recording of a subject vehicle 200,204,208 needs to capture a legible image of a license plate 202,210. Prior to step 402, one or more recording devices 14,18 may or may not already be active, recording, and/or storing video data. At step 402, an indication to begin a scan is provided to the system. As discussed above, this indication to begin may be provided by a user's manual input or based on one or more sensed trigger parameters. In some embodiments, the indication to begin a scan may activate one or more recording devices 14,18 and/or cause them to temporarily or permanently store video data. In response to the received indication, a scan is initiated by the system based on a program stored in memory, user input, and/or sensed parameters. At step 404, a first recording attribute, such as gain, is adjusted between within a first scan range. The first scan range is bound by an upper limit and a lower limit, which may be predetermined, based on sensed parameters, or manually selected by a user. While the first recording attribute is being adjusted, all other recording attributes may be held at selected values. The selected static values for each recording attribute not being adjusted may be predetermined, based on sensed parameters, or manually selected by a user. At step 406, the first recording attribute is held at a static value while a second recording attribute, such as shutter speed, is adjusted within a second scan range. Again, while the second recording attribute is being adjusted, all other recording attributes may be held at selected values, which again may be predetermined, based on sensed parameters, or manually selected by a user. In embodiments of the invention, these steps may be preformed for three or more recording attributes within their respective scan ranges. Further, the adjustment of each recording attribute within their respective scan ranges may alternatively be performed simultaneously, to achieve a faster (though possibly less robust) scan.

At step 408, a determination is made as to whether or not markings on a vehicle, such as those appearing on a license plate, have been legibly captured. In embodiments of the invention, representative frames from a scan may be presented via a display (such as on external computing device 22) for confirmation and/or selection by a user. As seen in FIG. 3, in embodiments of the invention a display screen 300 is presented to a user with frames 304, 306, and 308 selected from a scan. Frame 304 has the clearest image of the vehicle, but has no legible license plate data as explained in relation to FIG. 2B. Frames 306 and 308 have dark, blurry, or otherwise obscured images of the vehicle, but have successfully captured the license plate data needed for identification. A user may respond to these displayed frames 304,306, 308 via touching the screen or use of a separate input device to select one or more that include legible data. For instance, an officer 20 may select frames 306 and 308, indicating that the license plate 123XYZ is legible in each of these frames. Next, the officer may tap button 310 in response window 302 to store the selected frames in memory, associated with the video data captured of the traffic stop event. A text recognition program may then extract the data from one or more of the selected frames. At this point, the system proceeds to step 410 in which data from the license plate may be saved, possibly as metadata relating to the captured video data. For instance, the title of the stored video may be appended with the recognized license plate data. Additionally or alternatively, metadata related to the captured video data may include a link to a still image of the license plate data stored in memory.

FIG. 3 further includes buttons 312 and 314 in response window 302, as well as timer 316. Button 312 may be pressed by an officer 20 to indicate that a scan should be cancelled. This may be of use, for example, in case a traffic stop is uneventful or another officer has already documented the scene. Selection of button 312 may allow a user to rescan the scene if none of the frames 304,306,308 have legibly captured the license plate data. Selection of Rescan button 312 may initiate a modified scan, as further described below. Finally, FIG. 3 displays a timer 316, indicating a remaining amount of time before a timeout occurs. The total amount of time allowed before timeout may be programmed into memory or set by the user. Upon expiration of timer 316, the system may automatically cancel the scan, rescan, or initiate a modified scan. Alternatively, upon timeout the system may proceed to step 410, storing all of the displayed frames 304,306,308 in memory.

In other embodiments, step 408 may be performed initially by a computer text recognition algorithm. The algorithm may select representative frames from the scan and extract text from each frame, searching for a string of text that fits the appropriate format of a license plate. Alternatively, the algorithm may run continuously during the scan, and may halt the scan upon recognition of a string of characters in a valid format, such as in a license plate format. Valid formats may be stored in memory. In embodiments of the invention, the computer-recognized screen may be presented to a user along with an image frame from which it was extracted for user confirmation of successful license plate capture. At this point, the system proceeds to step 410 in which data from the license plate may be saved, possibly as metadata relating to the captured video data.

As has been described above, computer and/or user determination of successful capture of a legible image of a marking on a vehicle may initiate storage of at least a portion of the scan that includes the legible marking. However, in the event that capture of a legible image is determined to be unsuccessful, the system may perform an additional scan. The additional scan may activate automatically or in response to selection by a user. The additional scan may use recording attributes, scan ranges, and adjustment increments that are identical to those of the prior scan(s). Alternatively, the additional scan may be a modified scan, differing from the prior scan(s) in any or all of these elements.

A modified scan may be beneficial in situations with particularly difficult viewing conditions to provide an increased likelihood of capturing a legible image of a marking on a vehicle. The modified scan may simply select one or more different recording attributes for adjustment, such as gain and frame rate rather than white balance and focal distance. The modified scan may adjust the same recording attributes, but choose different upper and/or lower limits, modifying the scan range of one or more of the recording attributes. Modified upper and lower limits may define a larger scan range in a modified scan for a particular recording attribute, and/or may shift the original scan range. A modified scan may alternatively or additionally change the simultaneity of adjustment of recording attributes. For example, if in a previous failed scan, gain and white balance were adjusted within their respective scan ranges simultaneously, in a subsequent modified scan gain may be held at a static value while white balance is adjusted and vice versa. Any or all of the modifications discussed may be employed in a given modified scan, as well as any other modifications not expressly described.

While reference has been made above to the various components and techniques of embodiments of the invention, the description that follows will provide further examples systems and processes that may be added in embodiments of the invention. The description below is intended to merely exemplify steps that may be taken in practice of operation of embodiments of the invention and is not intended to be limiting. Further steps that may be performed in practice of some embodiments of the invention are illustrated in FIGS. 5A-C and herein described.

FIG. 5A begins at step 502, corresponding to step 402 of FIG. 4, in which an indication to begin a scan is provided to the system by a human or computer. The indication may be in response to one or more trigger parameters such as an indication that a police vehicle 16 is parked, a computer detection of a subject car, a detection of a license plate 200, an activation of a vehicle siren, and an activation of signal lights. At step 504, the lower and upper limits of the first scan range are determined for a first recording attribute. These limits may be predetermined, selected by a user, or determined dynamically based on sensed parameters such as a sensed light level. At step 506 the system determines whether or not the first recording attribute will be adjusted by uniform increments. If the increments are uniform, the process proceeds to step 508, at which the system determines whether the size of the uniform increments has been predetermined and stored in memory, or if the size needs to be determined based at least partially on sensed factors. If they are predetermined, the system proceeds to step 510, adjusting the first recording attribute between the first upper and lower limits using the uniform increments. If sensed factors must be taken into account, the system does so at step 512 before proceeding to the adjustment at step 510.

Returning to step 506, if the increments of adjustment are not uniform, the process proceeds to step 514, at which the system determines whether or not the system should perform a continuous sweep through across the scan range. If this determination is yes, the system adjusts the first recording attribute in this way at step 516. If the determination at step 514 is no, the system adjusts the first recording attribute using a set of predetermined or random non-uniform increments at step 518.

Each of these regimes of adjustment of the first recording attribute converge at step 520, at which the preceding process (beginning at step 504) is performed once again, this time with respect to the second recording attribute. In step 520, as in step 504, the system determines the upper and lower limits for the second scan range, corresponding to the second recording attribute. Again in steps 522, 524, 528 and 530 (FIG. 5B), determinations are made about how the second recording attribute is to be scanned within the second scan range. Each of these determinations are made in the same manner as the decision points at steps 506, 508, and 514, resulting in adjustment of the second recording attribute at steps 526, 528, or 534. The determinations made for adjustment of the second recording attribute may or may not be the same as those made for the first recording attribute. For example, the first recording attribute may be gain, adjusted by 1% increments from 50% to 100%, while the second recording attribute, may be white balance, adjusted continuously from the minimum to maximum white balance available to the system. This is meant only as an example, and is not intended to be limiting. Any combination of recording attributes, scan ranges, and scan regimes is intended to be within embodiments of the invention.

Specifically, at step 520, the lower and upper limits of the second scan range are determined for a second recording attribute. These limits may be predetermined, selected by a user, or determined dynamically based on sensed parameters such as a sensed light level. At step 522 the system determines whether or not the second recording attribute will be adjusted by uniform increments. If the increments are uniform, the process proceeds to step 524, at which the system determines whether the size of the uniform increments has been predetermined and stored in memory, or if the size needs to be determined based at least partially on sensed factors. If they are predetermined, the system proceeds to step 526, adjusting the second recording attribute between second first upper and lower limits using the uniform increments. If sensed factors must be taken into account, the system does so at step 528 before proceeding to the adjustment at step 526.

Returning to step 522, if the increments of adjustment are not uniform, the process proceeds to step 530, at which the system determines whether or not the system should perform a continuous sweep through across the second scan range. If this determination is yes, the system adjusts the second recording attribute in this way at step 532. If the determination at step 530 is no, the system adjusts the second recording attribute using a set of predetermined or random non-uniform increments at step 534.

Regardless of the determinations made, all of these regimes of adjustment of the second recording attribute converge at step 536. At this step the system determines whether or not a third attribute is to be adjusted within a third scan range. If so, the process proceeds through steps 538, 540, 542, 544, 546, 548, and 550 for determining the method of adjusting the third recording attribute. These steps are performed in the same manner as previously performed for the first and second recording attributes. These steps may be repeated for an arbitrary number of recording attributes, as determined by the system and/or a user.

Specifically, at step 540, the lower and upper limits of the third scan range are determined for a third recording attribute. These limits may be predetermined, selected by a user, or determined dynamically based on sensed parameters such as a sensed light level. At step 542 the system determines whether or not the third recording attribute will be adjusted by uniform increments. If the increments are uniform, the process proceeds to step 544, at which the system determines whether the size of the uniform increments has been predetermined and stored in memory, or if the size needs to be determined based at least partially on sensed factors. If they are predetermined, the system proceeds to step 546, adjusting the third recording attribute between the third upper and lower limits using the uniform increments. If sensed factors must be taken into account, the system does so at step 548 before proceeding to the adjustment at step 546.

Returning to step 542, if the increments of adjustment are not uniform, the process proceeds to step 550, at which the system determines whether or not the system should perform a continuous sweep through across the third scan range. If this determination is yes, the system adjusts the first recording attribute in this way at step 552. If the determination at step 550 is no, the system adjusts the third recording attribute using a set of predetermined or random non-uniform increments at step 554.

When the final recording attribute has been adjusted (which in the case of FIG. 5C is the third recording attribute) the system proceeds to step 554, where a determination is made of the legibility of the captured by the scan. This may be determined by a user in step 556. For example, the system may display one or more captured images of markings to a user for confirmation of success. Alternatively, computer text-recognition software may independently determine the success or failure of the scan. Via either approach, if in step 558 the system determines a successful capture of a legible image of markings on a vehicle, a portion of the scan including the markings is stored in memory at step 560. If, however, in step 558 the system determines an unsuccessful capture of a legible image of markings on a vehicle, the system proceeds to step 562 to determine whether an additional scan should be performed. This step may be performed automatically by the system or in response to user input. Determination of initiation of an additional scan by a user may be subject to a timeout, as described above. If an additional scan is rejected at step 562, the system quits at step 564, returning to its initial condition of waiting for an indication to begin a scan. If an additional scan is initiated at step 562, the system returns to step 502 to repeat the entire process. The additional scan may be identical to the first or may be a modified scan, differing in number or type of recording attributes adjusted, methods of adjustment, and/or scan ranges as described above.

It should be appreciated that, while the above disclosure is directed mainly to the field of law enforcement, some embodiments of the invention may be employed for any pursuit requiring legible video capture of information. Embodiments of the invention may be used in any setting or field, such as military or road maintenance vehicles, to maximize the likelihood of capturing a legible image of readable characters using a video camera. In embodiments of the invention, readable characters may be identified from sources other than license plates, such as billboards, street signs, bumper stickers, or apparel. Further, though the description above is uses a car as subject vehicle 200,204, 208, embodiments of the invention could equivalently be employed to identify a subject boat, trailer, motorcycle, etc. Embodiments of the invention may be used by private individuals or businesses to help prevent fraud, identify visitors, or track shipments. The law enforcement field discussed is merely exemplary and should not be construed as limiting.

Having thus described various embodiments of the invention, what is claimed as new and desired to be protected by Letters Patent includes the following:

The invention claimed is:

1. A video recording system comprising:
   a video recording device; and
   a recording device manager comprising a memory and one or more non-transitory computer-readable media that store computer-executable instructions that, when executed by at least one processor, perform a method of video recording by the video recording system, the method comprising:
      recording, using the video recording device, video data using predefined standard recording attributes;
      detecting a visual marking within the video data;
      responsive to detecting the visual marking within the video data, adjusting a value of at least one recording attribute of the video recording device within a scan range for the at least one recording attribute;
      recording, using the video recording device, updated video data using the value as adjusted of the at least one recording attribute;
      determining that a legible indication of the visual marking has been captured within the updated video data; and
      storing the updated video data including the legible indication,
      wherein the value of the at least one recording attribute is adjusted by a dynamic increment determined based on one or more sensed factors associated with the video recording system.

2. The video recording system of claim 1, wherein the value of the at least one recording attribute is adjusted by uniform increments within the scan range.

3. The video recording system of claim 1, wherein the visual marking comprises a license plate number on a vehicle.

4. The video recording system of claim 1, wherein the visual marking comprises one or more readable characters disposed on apparel.

5. The video recording system of claim 1, wherein the visual marking comprises one or more readable characters disposed on a street sign.

6. The video recording system of claim 1, wherein recording is triggered responsive to activation of a radar detecting a subject vehicle speed above a predetermined threshold speed.

7. The video recording system of claim 1, wherein the value of the at least one recording attribute is adjusted continuously by a continuous sweep within the scan range for the at least one recording attribute.

8. One or more non-transitory computer-readable media that store computer-executable instructions that, when executed by at least one processor, perform a method of video recording by a video recording system, the method comprising:
   recording, using a video recording device of the video recording system, video data using predefined standard recording attributes;
   detecting a trigger associated with the video recording system;
   responsive to detecting the trigger, adjusting a value of at least one recording attribute of the video recording device within a scan range for the at least one recording attribute;
   recording, using the video recording device, updated video data using the value as adjusted of the at least one recording attribute; and
   determining that a legible indication of a visual marking has been captured within the updated video data,
   wherein the scan range comprises a dynamically selected scan range including a dynamic upper limit and a dynamic lower limit for the at least one recording attribute,
   wherein the dynamic upper limit and the dynamic lower limit are selected based on one or more ambient parameters.

9. The one or more non-transitory computer-readable media of claim 8, wherein the visual marking comprises a license plate number on a vehicle.

10. The one or more non-transitory computer-readable media of claim 9, wherein the trigger is associated with identifying the license plate number.

11. The one or more non-transitory computer-readable media of claim 8, wherein the trigger is associated with activation of one or more vehicle signal lights.

12. The one or more non-transitory computer-readable media of claim 8, wherein the trigger is associated with activation of a radar detecting a subject vehicle speed above a predetermined threshold speed.

13. The one or more non-transitory computer-readable media of claim 8, wherein the value of the at least one recording attribute is adjusted continuously by a continuous sweep within the scan range for the at least one recording attribute.

14. A method of video recording by a video recording system, the method comprising:
   recording, using a video recording device of the video recording system, video data using predefined standard recording attributes;
   detecting a visual marking within the video data;
   responsive to detecting the visual marking within the video data, adjusting a value of at least one recording attribute of the video recording device within a scan range for the at least one recording attribute;

recording, using the video recording device, updated video data using the value as adjusted of the at least one recording attribute;

determining that a legible indication of the visual marking has been captured within the updated video data;

storing the updated video data including the legible indication of the visual marking within a memory associated with the video recording system; and responsive to determining that the legible indication of the visual marking has not been captured within the updated video data, further adjusting the value of the at least one recording attribute within the scan range for the at least one recording attribute.

15. The method of claim 14, further comprising:

adjusting a subsequent value of a subsequent recording attribute within a subsequent scan range for the subsequent recording attribute.

16. The method of claim 14, wherein the visual marking comprises a license plate number on a vehicle.

17. The method of claim 14, wherein the value of the at least one recording attribute is adjusted continuously by a continuous sweep within the scan range for the at least one recording attribute.

18. The method of claim 14, wherein the value of the at least one recording attribute is adjusted incrementally by a plurality of predefined increments within the scan range for the at least one recording attribute.

19. The method of claim 14, wherein recording is triggered responsive to activation of one or more vehicle signal lights.

20. The method of claim 14, wherein the scan range comprises a predefined scan range including a predefined upper limit and a predefined lower limit for the at least one recording attribute.

* * * * *